United States Patent [19]
Cote

[11] Patent Number: 6,105,266
[45] Date of Patent: Aug. 22, 2000

[54] CARPENTER'S ROOF PITCH MEASURING DEVICE

[76] Inventor: David C. Cote, 182 Burke St., East Hartford, Conn. 06118

[21] Appl. No.: 09/061,397

[22] Filed: Apr. 16, 1998

[51] Int. Cl.[7] .................................. B43L 7/14; G01B 5/24
[52] U.S. Cl. ................................ 33/451; 33/427; 33/464
[58] Field of Search .............................. 33/451, 418, 419, 33/420, 421, 423, 427, 452, 464, 471, 476

[56] References Cited

U.S. PATENT DOCUMENTS

| | | |
|---|---|---|
| 247,353 | 9/1881 | Howard . |
| 525,611 | 9/1894 | Nichols ................................ 33/427 |
| 650,992 | 6/1900 | Sawyer ................................ 33/451 |
| 888,070 | 5/1908 | Dissell ................................ 33/464 |
| 1,241,976 | 10/1917 | Hill . |
| 2,435,644 | 2/1948 | Beckett et al. . |
| 2,753,633 | 7/1956 | Calver ................................ 33/451 |
| 2,859,527 | 11/1958 | Roche . |
| 4,200,990 | 5/1980 | West . |
| 4,420,891 | 12/1983 | Orem ................................ 33/476 |
| 4,693,011 | 9/1987 | Strayham ............................ 33/451 |
| 5,131,164 | 7/1992 | Miller . |
| 5,253,426 | 10/1993 | Mosbrucker . |
| 5,269,066 | 12/1993 | Walters . |
| 5,339,530 | 8/1994 | Wright . |

*Primary Examiner*—Christopher W. Fulton
*Attorney, Agent, or Firm*—McCormick, Paulding & Huber LLP

[57] ABSTRACT

A carpenter's "square" has a first member with a spirit level so it can be held horizontal with one end elevated above a pitched roof, while the opposite end rests on the roof exactly 12 inches from the inside edge of a vertically movable member supported in the first member, and clamped to it by a thumb screw. This inside edge is graduated inches to read out roof pitch directly in "inches per foot".

4 Claims, 1 Drawing Sheet

U.S. Patent    Aug. 22, 2000    6,105,266
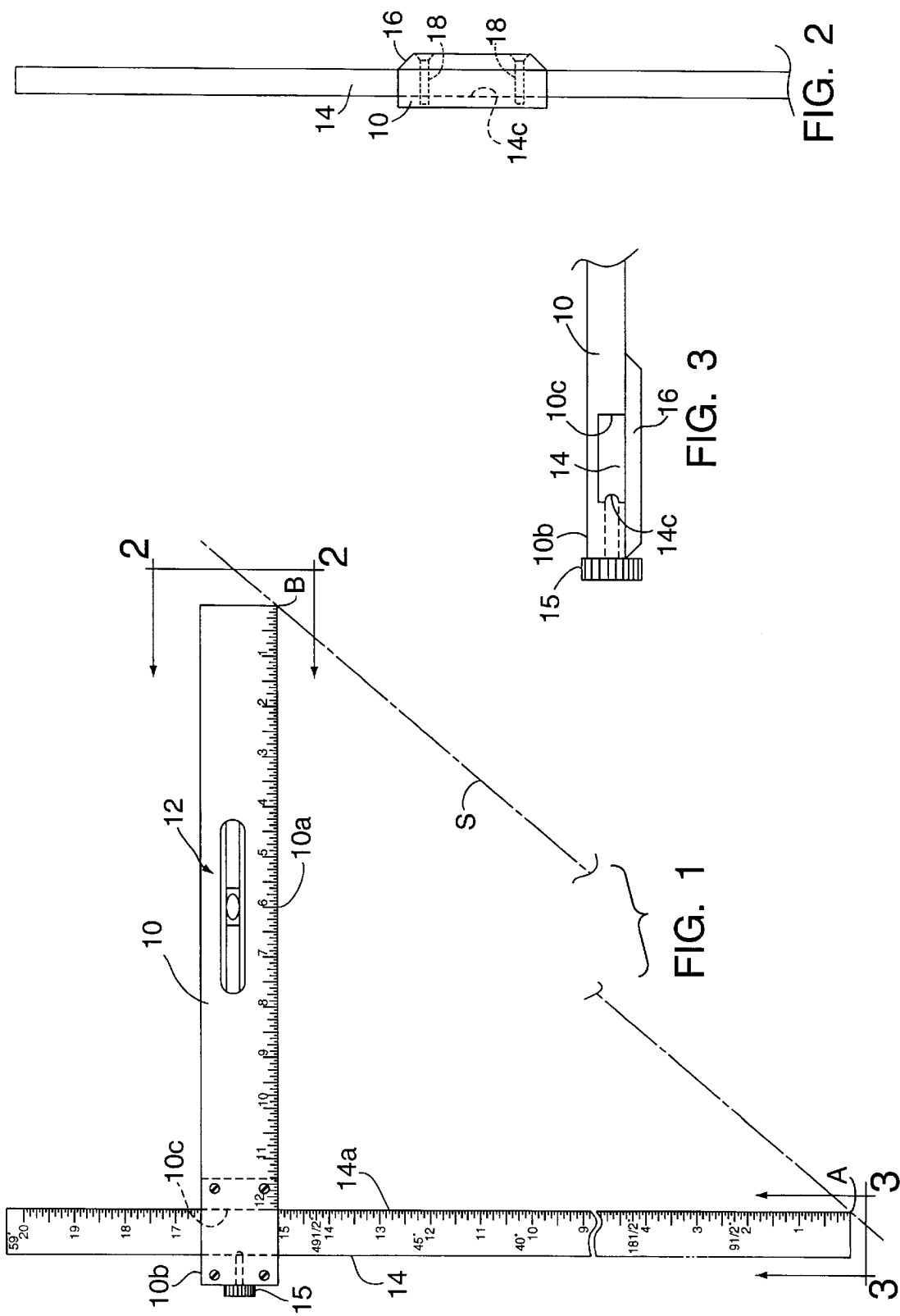

250
CARPENTER'S ROOF PITCH MEASURING DEVICE

BACKGROUND OF THE INVENTION

This invention relates generally to a unique carpenter's square that is especially designed for quick measurement of roof pitch. Carpenter's squares, including those with level of spirit provided in one leg of the square, are of course well known in the art. However, no prior art Carpenter's square to my knowledge has been designed to provide a convenient tool for measuring roof pitch. Normally, the carpenter must perform calculations that can lead to errors, and that are time consuming in nature.

It is known, for example, to provide a carpenter's level (of two to four feet in length) so that one end of the level contacts the roof, and to hold the ruler or tape measurer so that the free end of the level is above the roof. The carpenter then measures the elevation of the free end of the level, but must then calculate the slope based on the inches on his tape measurer, and the length of his level to arrive at the actual roof pitch in inches per foot.

The object of the present invention is to provide a single tool or device that the carpenter can carry in his tool box, and that can be used to directly measure roof pitch in inches per foot, and incidentally in angular degrees of roof pitch as well.

In accordance with the present invention, a carpenter's square is provided with a horizontally extending leg equipped with a spirit level so as to assure that this leg of the square is held horizontal while a vertical leg of the square is slidably received in the end portion of the horizontal leg so it can be conveniently clamped by a set screw to afford an indication in inches per foot of roof slope. The horizontal leg of the square is made exactly 12 inches from the inside edge of the vertical member to the outer edge of the horizontal leg or member, and may have an overall length of 14 inches.

The vertical leg is slidably received in the end portion of the horizontal leg and may have overall length of approximately 20 inches in length so as to afford a convenient means for measuring roof pitch of relatively steep slope.

BRIEF DESCRIPTION OF THE DRAWINGS

FIG. 1 is an elevational view of a device constructed in accordance with the present invention, and also illustrates a roof pitch in the process of being measured.

FIG. 2 is an end view taken generally on the line 2,2 of FIG. 1.

FIG. 3 is an end view taken generally on the line 3,3 of FIG. 1.

DETAILED DESCRIPTION OF THE DRAWINGS

Turning now to the drawings in greater detail, the invention, in its presently preferred form, comprises a generally horizontally extending member 10 having a spirit level 12 provided therein so as to assure a generally horizontally disposed lower edge 10a of the member 10 when the device is used in the position shown relative to a roof pitch S for purposes of measuring, in inches per foot, the slope of the roof.

A vertically extending member 14 is slidably secured in an opening 10c in a free end portion 10b of the horizontal member 10, and is held in the position shown for it by a thumb screw, indicated generally at 15. The thumb screw 15 is threadably received in the end portion 10b of the horizontal member 10 for this purpose.

As best shown in FIGS. 2 and 3, the opening 10c is formed by a groove or notch in the horizontal member 10 that has a depth of approximately the thickness of vertical member 14. A cover plate 16 is secured to the back side of the free end 10b of the member 10 by screw fasteners 18. The spirit level 12 is provided in a through slot of member 10 so as to be visible from both the front and rear side of member 10. The graduations on both members 10 and 14 are provided on both sides of these members to further increase the usefulness and the adaptability of the device for its intended purpose.

As shown, the vertically extending member 14 can be moved downwardly until the lower end contacts the roof S as indicated generally at Point A in FIG. 1. With the opposite end portion of the horizontal member 10 in contact with the roof S at the Point B, one can read from a scale on the vertical member 14 directly in inches per foot, the slope of the roof. As shown, the horizontally extending member has a scale on its lower edge that is 12 inches when measured from the inside edge 14a of the vertical member to the Point B. Twelve graduations in inches are provided on this horizontal member 12 as shown, and it is important that the horizontal member 12 extends for twelve inches from the edge 14a of the vertical member 14 to the opposite end of the horizontal member that contacts the roof as suggested at B at FIG. 1.

The vertical member 14 also graduations in inches as shown, running from 1 inch to at least 20 inches, so that slopes of roofs of various pitch can be conveniently measured with the device shown and described herein. In roof S, it will be apparent that the pitch S is 15 inches per foot in the example shown. In addition to the inch graduations on member 14, I have also included the slope in degrees corresponding to the inches per foot slope. The end of the thumb screw 15 preferably engages a groove 14c in the outside edge of member 14 to provide a more secure clamping action on the member 14. Note the right triangle formed by the members 10 and 14, and the roof slope S forming the hypotenuse of this right triangle.

From the foregoing description, it will be apparent that the operation of the device can be readily understood, and further explanation is deemed to be unnecessary. However, it should be noted that numerous modifications and changes will readily occur to those skilled in the art. While it is not desired to limit the invention to the exact construction shown and described, it is noted that these modifications and equivalents may be resorted to within the scope of the following claims.

What is claimed is:

1. A carpenter's device for measuring roof pitch comprising:

a first member including an end portion defining an opening therethrough, said opening being further defined by an edge that is twelve inches from the opposite end of the first member;

a second member slidably received in said opening in said first member, and graduations provided on said second member, and a spirit level provided in said first member visible from both sides of said first member, means for securing said second member in said opening of said first member whereby said second member is orthogonally oriented to said first member, and whereby the inside edges of said first and second member respectively define the angles of a right triangle of which the hypotenuse is defined by the roof to be measured.

2. The device according to claim 1, wherein said second member has a length of approximately 20 inches to provide measurement of a variety of roof slopes.

3. The device according to claim 1, wherein said second member is graduated in inches, and also has provision for indicating roof slope in degrees relative to the horizontal.

4. The device according to claim 1, wherein said means for securing said second member in said opening of said first member comprises said second member has an outside edge defining a groove, and a set screw being threadably received in the end portion of the horizontal member so as to engage said outside edge of said second member.

* * * * *